United States Patent
Pyun et al.

(10) Patent No.: US 9,986,262 B2
(45) Date of Patent: May 29, 2018

(54) REFERENCE FRAME SELECTION TECHNIQUE FOR ERROR RESILIENCE OF VIDEO CODEC USING MULTIPLE REFERENCE FRAMES

(71) Applicant: Industry-Academic Cooperation Foundation Chosun University, Gwangju (KR)

(72) Inventors: Jae-Young Pyun, Gwangju (KR); Hee-Seon Gang, Jeollanam-do (KR)

(73) Assignee: INDUSTRY-ACADEMIC COOPERATION FOUNDATION CHOSUN UNIVERSITY, Gwangju (KR)

( * ) Notice: Subject to any disclaimer, the term of this patent is extended or adjusted under 35 U.S.C. 154(b) by 280 days.

(21) Appl. No.: 14/651,057

(22) PCT Filed: Mar. 25, 2013

(86) PCT No.: PCT/KR2013/002454
§ 371 (c)(1),
(2) Date: Jun. 10, 2015

(87) PCT Pub. No.: WO2014/092249
PCT Pub. Date: Jun. 19, 2014

(65) Prior Publication Data
US 2016/0080775 A1    Mar. 17, 2016

(30) Foreign Application Priority Data
Dec. 12, 2012   (KR) .................. 10-2012-0144177

(51) Int. Cl.
H04N 19/61     (2014.01)
H04N 19/107    (2014.01)
(Continued)

(52) U.S. Cl.
CPC .......... *H04N 19/65* (2014.11); *H04N 19/105* (2014.11); *H04N 19/147* (2014.11);
(Continued)

(58) Field of Classification Search
CPC ...... H04N 7/16; H04N 13/0048; H04N 19/65; H04N 19/573
See application file for complete search history.

(56) References Cited

U.S. PATENT DOCUMENTS

| 2010/0211843 | A1 | 8/2010 | Dacosta |
| 2012/0082226 | A1 | 4/2012 | Weber |
| 2013/0229485 | A1* | 9/2013 | Rusanovskyy .... H04N 13/0048 348/43 |

FOREIGN PATENT DOCUMENTS

| KR | 20060078289 A | 7/2006 |
| KR | 20060089694 A | 8/2006 |

(Continued)

OTHER PUBLICATIONS

International Search Report dated Sep. 11, 2013 for PCT/KR2013/002454 and English translation.

*Primary Examiner* — Sathyanaraya V Perungavoor
*Assistant Examiner* — Patricia I Young
(74) *Attorney, Agent, or Firm* — Lucas & Mercanti, LLP

(57) ABSTRACT

The present invention relates to a reference frame selection technique for an error resilience of video codec using multiple reference frames. The reference frame selection technique for an error resilience of video codec using multiple reference frames according to the present invention comprises the steps of: performing a motion estimation individually in each of the multiple reference frames so as to search a reference macroblock of the macroblock to be coded; checking the degree of match between the reference macroblock region found by the motion estimation and the intra-coded macroblock of the reference frame; and select-
(Continued)

ing the motion vector (MV) of the reference macroblock which is relatively best matched to the intra-coded macroblock of the reference frame from among the reference macroblocks found in each of the multiple reference frames.

1 Claim, 4 Drawing Sheets

(51) Int. Cl.
| | |
|---|---|
| *H04N 19/132* | (2014.01) |
| *H04N 19/147* | (2014.01) |
| *H04N 19/176* | (2014.01) |
| *H04N 19/65* | (2014.01) |
| *H04N 19/105* | (2014.01) |
| *H04N 19/172* | (2014.01) |
| *H04N 19/513* | (2014.01) |
| *H04N 19/537* | (2014.01) |
| *H04N 19/139* | (2014.01) |
| *H04N 19/895* | (2014.01) |
| *H04N 19/573* | (2014.01) |
| *H04N 19/109* | (2014.01) |
| *H04N 19/58* | (2014.01) |

(52) U.S. Cl.
CPC ......... *H04N 19/172* (2014.11); *H04N 19/176* (2014.11); *H04N 19/513* (2014.11); *H04N 19/537* (2014.11); *H04N 19/109* (2014.11); *H04N 19/139* (2014.11); *H04N 19/573* (2014.11); *H04N 19/58* (2014.11); *H04N 19/895* (2014.11)

(56) References Cited

FOREIGN PATENT DOCUMENTS

| | | | |
|---|---|---|---|
| KR | 100878536 B | 5/2008 | |
| KR | 20090094595 A | 9/2009 | |
| KR | 20110050283 A * | 5/2011 | ............. H04N 5/145 |

\* cited by examiner

MV search procedure of the proposed error resilient reference selection method.

Refresh ratio calculation procedure for current MB in reference frames

REFERENCE FRAME SELECTION TECHNIQUE FOR ERROR RESILIENCE OF VIDEO CODEC USING MULTIPLE REFERENCE FRAMES

CROSS-REFERENCE TO RELATED APPLICATIONS

This application is a U.S. national stage of PCT/KR2013/002454, filed Mar. 25, 2013, which claims the priority from Korean Patent Application No. 10-2012-0144177, filed Dec. 12, 2012, the contents of each of which are incorporated herein by reference.

TECHNICAL FIELD

The present invention generally relates to a method for selecting a reference frame of a video codec and, more particularly, to a method for selecting a reference frame for error resilience of a video codec using multiple reference frames (MRF) for a more efficient and reliable video streaming service in an erroneous network environment by reducing weakness in error propagation, which is a limitation of an existing MRF using method used for improving compression efficiency.

BACKGROUND ART

Generally, for efficient video compression, a video encoder removes redundancy and performs motion estimation in units of macroblocks (MBs) between video frames. Accordingly, since encoding is performed with reference to a redundant portion in an area encoded before, a data size may be reduced. However, a case where a corresponding area is lossy in a video transmission process affects not only lossy frames but also a plurality of frames behind them that reference the lossy area.

In addition, in order to reduce such an effect in various channels, error resilience coding is necessary, and a random intra refresh (RIR) scheme, which is strongest error resilience coding scheme, is widely used.

However, for a video codec based on MRF such as H.264/AVC that had an MB refresh and is useable according to the RIR scheme, a phenomenon that an error resilience effect is decreased occurs, which is discussed in "M. G. S. Moiron, I. Ali and M. Fleury, "Limitations of multiple reference frames with cyclic intra-refresh line for h.264/avc," ELECTRONIC LETTERS, vol. 47, pp. 103104, January 2011", wherein the H.264 is a kind of H.26x video standard proposed ITU-T and is normally called H.264/AVC or AVC/H.264, H.264/MPEG-4 AVC, MPEG-4/H.264 AVC and called AVC, which in MPEG technology is a name of MPECG-4 part 10.

As described above, the error weakness phenomenon in the codec using the MRF is additionally described below with a schematic description using H.264/AVC.

H.264/AVC is a video codec widely used nowadays and such a H.264/AVC standard is formed of two layers divided into a video coding layer (VCL) and a network abstraction layer (NAL).

The VCL supports technique elements pertaining to a video encoding process, and the NAL is between with a lower layer system transmitting and storing encoded information. Encoded data generated in the VCL is packetized in a real-time transport protocol (RTP) in units of NALs in a network environment, and received RTP packets are recovered to a video by a decoder in a reception stage. The RTP packets may be at risk of loss in an environment such as a wireless network in which channel errors may occur, and in this case, the decoder in the reception stage may not wholly or perfectly recover the video.

The H.264/AVC encoder supports error resilience schemes for performing a preprocess in order to reduce deterioration in display quality of an image, which occurs at the time of recovering the video through the decoder in the reception stage in a state where some data is lossy due to channel errors, and the decoder supports error concealment schemes for performing a post-process in order to continuously recover the video when a portion of data is lossy due to the errors.

In addition, an H.264/AVC standard decoder performs motion estimation by using MRF to improve compression efficiency. When a frame Ft at time t is encoded, since an optimal block may be selected from arbitrary frames between Ft−n and Ft+n as well as a previous frame Ft−1, high efficiency motion estimation may be realized. This results from the fact that a background covered by a moving object and thus not shown, may be estimated from a frame at another time by using the MRF.

In addition, like this, a video encoded by using the motion estimation is recovered with reference to video data from reference frames through motion compensation in the decoder.

Here, when a portion of video data is lossy in an environment such as a wireless network where errors may occur, an error propagation phenomenon occurs affecting other frames on which motion compensation is performed with reference to a lossy area.

The H.264/AVC standard also supports the RIR scheme in order to prevent errors from being propagated like this. In other words, when each frame is encoded, some MBs are independently encoded without motion estimation performed thereon, and since, at the time of decoding, motion compensation is not performed on a corresponding area, the error propagation is prevented. In the case where one previous frame is used as a reference frame, although a corresponding frame is lossy, an intra refresh area of the frame behind the previous frame is normally recovered and the error may be rapidly recovered since subsequent frames refer to the normally recovered area.

However, when MRF are used, the error may not be rapidly recovered although periodic intra refresh data is inserted. This is because when loss occurs in the previous frame Ft−1, a portion of area of Ft will be recovered with intra refresh data, but, when motion compensation is performed from Ft−1 not from Ft at a subsequent frame Ft+1, the recovered area may be lossy again. Accordingly, when decoding is performed by using MRF, a compression efficiency increases, but when some data is lossy in a process of transmitting a video in a network environment, display quality of the image becomes more deteriorated.

Referring to FIGS. 1A and 1B, illustrated is a phenomenon appearing when some of compressed video data is damaged in a video codec using the MRF and RIR scheme, and a method proposed to correct this.

For the case of FIG. 1A, first, through a picture frame (P-frame) 11 for which the p-frame is called a first P-frame and subsequent P-frames are sequentially called a second to n-th P-frame for convenience, a specific inter-coded macroblock (MB) 12b of the second P-frame 12 is image-corrected, and at this point, since the image correction is performed on the specific inter-coded MB included in the second P-frame 12 by an inter-coded MB 11*b* included a damaged area 11*a* of the first P-frame 11, a normal image correction is not performed.

In addition, like this, as the specific inter-coded MB 12*b* of the second P-frame 12, which is not normally corrected, is used for image correction of a specific inter-coded MB 14*b* included in the fourth P-frame 14, a corresponding coded MB 14*b* of the fourth P-frame 14 is not normally corrected. Furthermore, the third P-frame 13 exemplarily shows that image correction is performed on the third P-frame 13 within itself with the intra-coded MB 13*b*.

In addition, for the case of FIG. 1B, a specific inter-coded MB 22*b* of the second P-frame is corrected through the first P-frame 21 having a damaged area 21*a*, and at this point, since the specific inter-coded MB 22*b* included in the second P-frame 22 is corrected with an inter-coded MB 21*b* included in the damaged area 21*a* of the first P-frame 21, normal image correction is not performed.

However, the third P-frame 23 is corrected within itself with the intra-coded MB 23*b*. The fourth P-frame 24 exemplarily shows that the intra-coded MB 23*b* of the third P-frame 23 is used for image correction on the specific inter-coded MB 24*b* of the fourth P-frame 24. In other words, since the intra-coded MB 23*b* is used for the image correction of the specific inter-coded MB 24*b* of the fourth P-frame 24, the image correction is performed with the error propagation blocked.

DISCLOSURE

Technical Problem

Accordingly, the present invention has been made keeping in mind the above problems occurring in the prior art, and an object of the present invention is to provide a method for selecting a reference frame of a video codec and, more particularly, to a method for selecting a reference frame for error resilience of a video codec using multiple reference frames (MRF) for a more efficient and reliable video streaming service in an erroneous network environment by reducing weakness in error propagation, which is a limitation of an existing MRF using method used for improving compression efficiency.

Another object of the present invention is to provide a method for selection a reference frame for error resilience of a video codec using MRF, which is capable of improving error resilience of a periodic intra refresh scheme as well as using an MRF scheme.

Technical Solution

In order to accomplish the above objects, the present invention provides a method for selecting a reference frame for error resilience of a video codec using multiple reference frames (MRF), the method including: (a) individually performing motion estimation for each of MRF for searching a reference macroblock (MB) of an MB to be encoded; (b) checking a matching degree of a reference MB area found with the motion estimation with an intra-coded MB area of a corresponding frame to be encoded; (c) selecting a motion vector (MV) of a reference MB relatively matching best with the intra-coded MB of the reference frame among the found reference MBs at the MRF.

In addition, operation (b) may include storing a position indicated by each of the found MVs from the MBF and comparing positions of an area indicated by each MV with the intra-coded MB area to calculate the matching degree between the two areas. Here, the calculating of the matching degree between the area indicated by each MV with the intra-coded MB area may be calculating a refresh ratio that is the matching degree of the two areas on the basis of a size and number of pixels of the MBs.

In addition, operation (c) may include comparing together the refresh ratios of the MVs individually found from the MRF to select an MV having a highest refresh ratio.

In addition, operation (c) may include determining an MV through a motion vector determining mode at the time of previous encoding when the refresh ratios of all the MVs individually found from the MRF are equal to or smaller than a preset minimum value.

Advantageous Effects

According the present invention, error propagation can be reduced, which is a limitation of an existing MRF using scheme used for improving compression efficiency, and a more efficient and reliable video streaming service can be provided in an error-prone network environment.

In addition, while a multiple reference frame scheme is used, error resilience of a periodic intra refresh scheme can also be improved.

BEST MODE

Figure 1A:
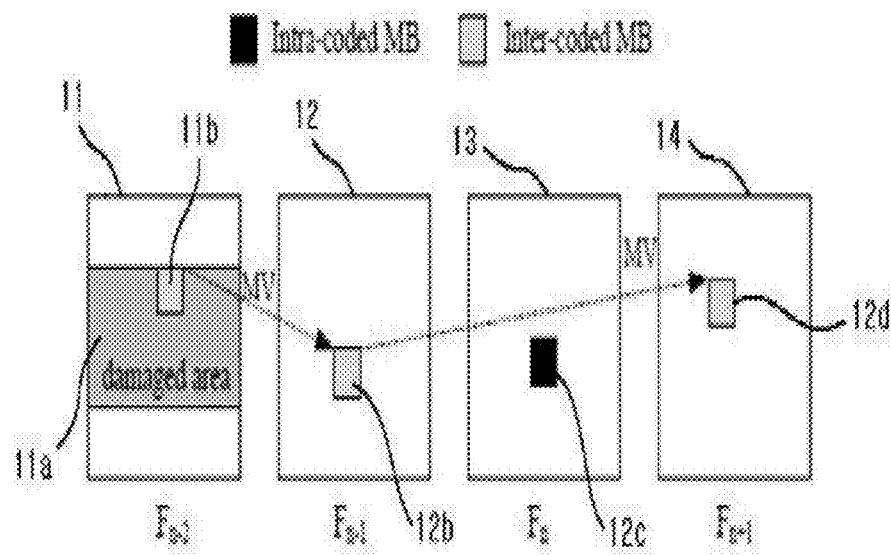
FIGS. 1A and 1B are a view exemplarily illustrating a phenomenon occurring when a portion of compressed video data is damaged in a video codec using multiple reference frames (MRF) and a random intra refresh (RIR) scheme, and a method for correcting the phenomenon.
Figure 1B:
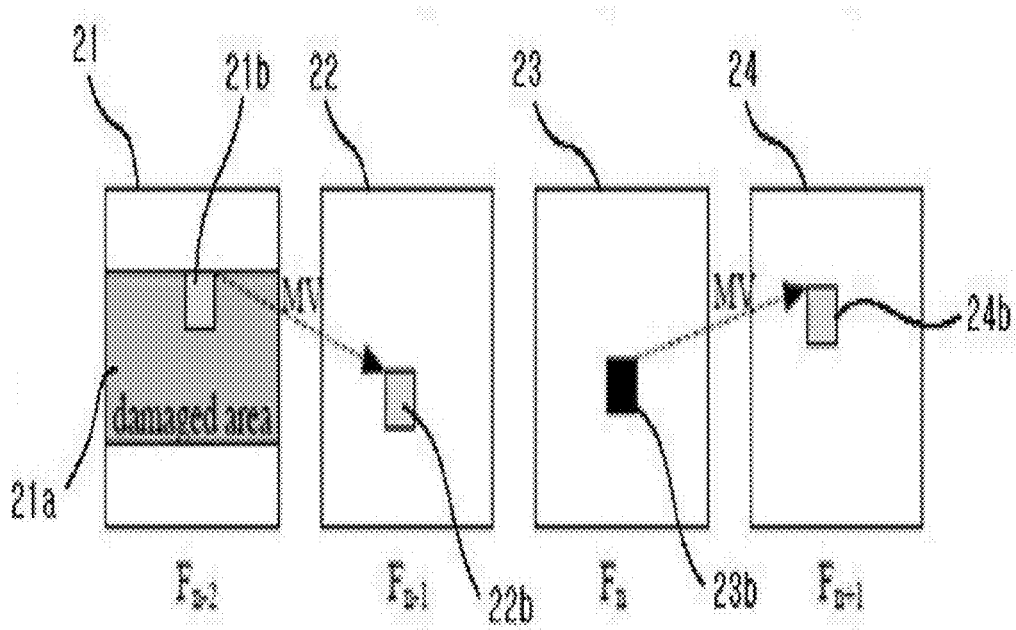

Reference should now be made to the drawings, in which the same reference numerals are used throughout the different drawings to designate the same or similar components.

Hereinafter a method for selecting a reference frame for error resilience of a video codec using multiple reference frames (MRF) according to an embodiment of the present invention will be described in detail with reference to the accompanying drawings.

Figure 2:
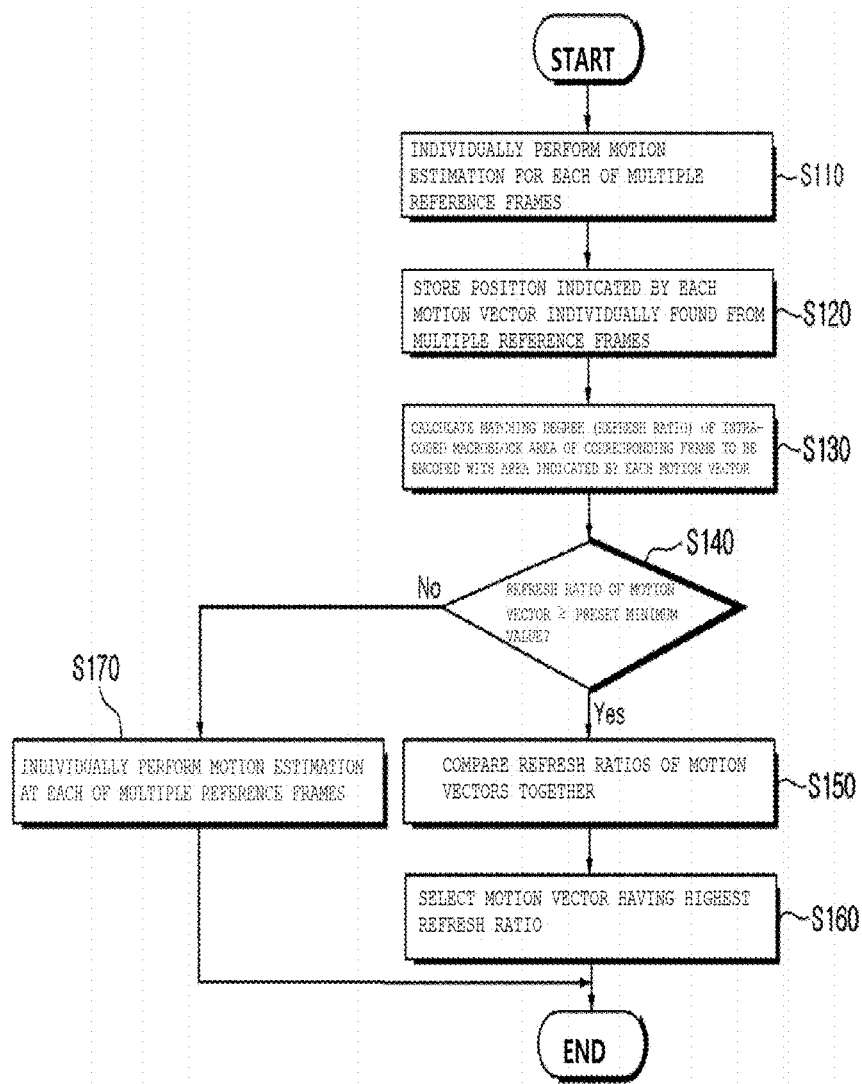
FIG. 2 is a flowchart illustrating a method for selecting a reference frame for error resilience of a video codec using MRF according to an embodiment of the present invention.

FIG. 2 is a flowchart illustrating a method for selecting a reference frame for error resilience of a video codec using MRF according to an embodiment of the present invention.

As illustrated, in a method for selecting a reference frame for error resilience of a video codec using MRF according to an embodiment of the present invention, motion estimation is individually performed on each of the MRF (operation S110). In other words, the motion estimation is individually performed on each of MRF for searching for a reference macro block (MB) of an MB to be encoded.

Then positions respectively indicating respective motion vectors individually found from the MRF are stored in operation S120. In operation S130, a matching degree of an arbitrary intra-coded MB area with areas respectively indicating motion vectors (MVs) individually found from the MRF is calculated. In a description below, terms 'refresh ratio' will be used for the matching degree of the intra-coded MB area of a corresponding encoded frame with the areas respectively indicating MVs individually found from the MRF.

In addition, in operation S130, the refresh ratio is calculated for the matching degree of the intra-coded MB area of the corresponding encoded frame with the areas respectively indicating MVs individually found from the MRF on the basis of the size and number of pixels of the MB.

In operation 140, it is determined whether the refresh ratio calculated through operation S130 is equal to or smaller than a preset minimum value.

Then, in operation S150, when the refresh ratio calculated through operation S130 is equal to or smaller than the preset minimum value, refresh ratios for the MVs individually found from the MRF are compared.

In operation S160, an MV having a highest refresh ratio is selected from among the refresh ratios compared through operation S150.

Furthermore, in operation S140, when the refresh ratio calculated through operation S130 is equal to or smaller than the preset minimum value, the MV is determined through a MV determination mode at the time of previous encoding in operation S170.

Figure 3:
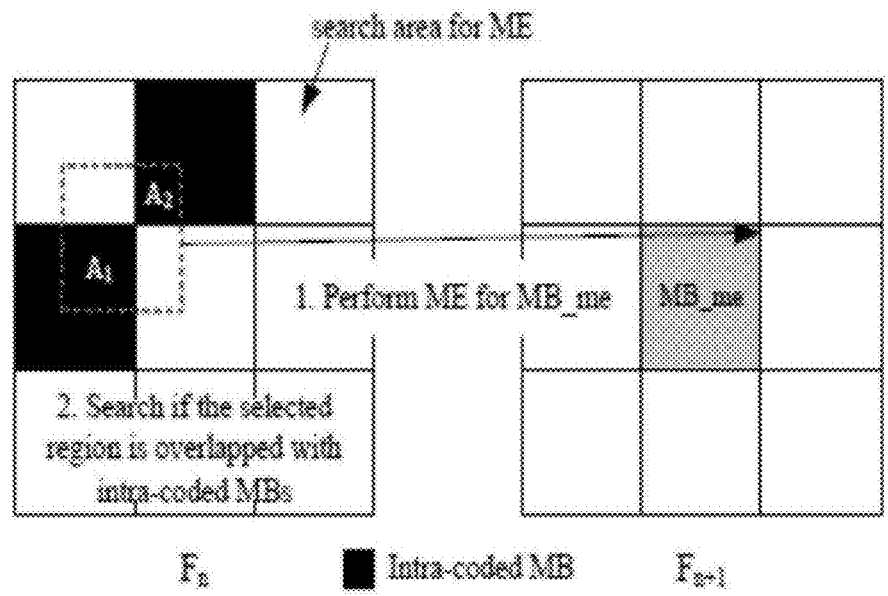
FIG. 3 is a view exemplarily illustrating a process where a motion vector is searched for and determined by using a method for selecting a reference frame for error resilience of a video codec using MRF according to an embodiment of the present invention.
Figure 3:
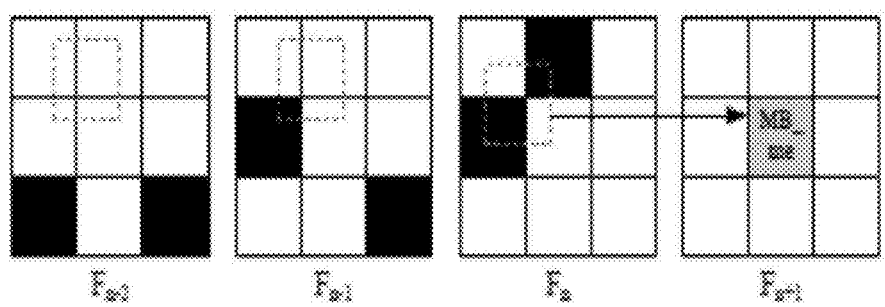

FIG. 3 is a view exemplarily illustrating a process that an MV is searched for and determined by using a method for selecting a reference frame for error resilience of a video codec using MRF according to an embodiment of the present invention.

As illustrated, each frame of MRF includes intra-coded MBs at arbitrary positions according to the RIR scheme. In addition, an optimal MV is determined by searching for an optimal reference area and then calculating a matching degree of a corresponding area with the intra-coded area, and at this point, for an encoder using MRF, each optimal MV is found from the MRF, and among them, a final MV is determined at a position of an MB matching best with a partially or entirely intra-coded MB. In other words, at the time of motion estimation, the intra-coded area is preferentially selected to reduce the error propagation caused by referring to a lossy area even though a portion of the image undergoes loss in a transmission process.

As can be seen through embodiments in relation to FIGS. 2 and 3, a method for selecting a reference frame for error resilience of a video codec using plural reference frames according to the present invention enables error propagation to be reduced, which is a limitation of the exiting MRF using scheme used for improving compression efficiency, and enables a more efficient and reliable video streaming service to be provided in an error-prone network environment.

In addition, a method for selecting a reference frame for error resilience of a video codec using plural reference frames according to the present invention enables error resilience in a periodic intra refresh scheme to be improved while the MRF scheme is used.

The above description is just an embodiment for practicing a method for selecting a reference frame for error resilience of a video codec using plural reference frames, and those skilled in the art will appreciate that various modifications, additions and substitutions are possible, without departing from the scope and spirit of the invention as disclosed in the accompanying claims.

INDUSTRIAL APPLICABILITY

As described above, the present invention may be used for improving a compression efficiency of a video codec.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A method for selecting a reference frame for error resilience of a video codec using multiple reference frames (MRF), the method comprising:
   (a) individually performing motion estimation for each of MRF for searching a reference macroblock (MB) of an MB to be encoded;
   (b) checking a matching degree of a reference MB area found with the motion estimation with an intra-coded MB area of a corresponding frame to be encoded;
   (c) selecting a motion vector (MV) of a reference MB relatively matching best with the intra-coded MB of the reference frame among found reference MBs at the MRF,
   wherein operation (b) comprises
      storing a position indicated by each found MVs from the MRF and
      comparing positions of an area indicated by each MV with the intra-coded MB area to calculate a refresh ratio that is the matching degree of the area indicated by each MV and the intra-coded MB area on the basis of a size and number of pixels of the MBs, and
   wherein operation (c) comprises comparing together the refresh ratios of the MVs individually found from the MRF to select an MV having a highest refresh ratio using a motion vector determining mode at a time of previous encoding when the refresh ratios of all the MVs individually found from the MRF are equal to or smaller than a preset minimum value.

* * * * *